US006162880A

United States Patent [19]

Sosa et al.

[11] Patent Number: 6,162,880

[45] Date of Patent: Dec. 19, 2000

[54] PURIFICATION OF POLYSTYRENE RECYCLE STREAMS

[75] Inventors: Jose M Sosa, Deer Park; LuAnn Kelly, Friendswood, both of Tex.

[73] Assignee: Fina Technology, Inc., Houston, Tex.

[21] Appl. No.: 09/120,666

[22] Filed: Jul. 22, 1998

[51] Int. Cl.[7] .......................... C08F 12/06; C08F 297/02

[52] U.S. Cl. ................................ 526/67; 526/65; 526/68; 526/227; 526/232.5; 525/53; 525/54; 525/316

[58] Field of Search ................................ 526/65, 68, 67, 526/227, 232.5; 525/53, 54, 316

[56] References Cited

U.S. PATENT DOCUMENTS 4,777,210 10/1988 Sosa et al. ................................ 525/53
4,857,587 8/1989 Sosa et al. ............................ 525/54 X
4,861,827 8/1989 Sosa et al. ................................ 525/54
5,200,476 4/1993 Sosa et al. ............................ 526/68 X

FOREIGN PATENT DOCUMENTS 0323428 5/1989 European Pat. Off. .
0499499 1/1992 European Pat. Off. .
2306232 3/1976 France .
2554111 10/1983 France .

*Primary Examiner*—Fred Teskin
*Attorney, Agent, or Firm*—Jim D. Wheelington

[57] ABSTRACT

A process is disclosed for enhancing the production of polymerized monovinyl aromatic compounds, in which process a small polymerization reactor is inserted in the recycle stream to deactivate the polymerization inhibitors in the recycle stream and to further increase the conversion level of monomer to desirable polymer.

11 Claims, 2 Drawing Sheets

PURIFICATION OF POLYSTYRENE RECYCLE STREAMS

BACKGROUND OF THE INVENTION

The present invention relates to a polymerization process for manufacturing various grades of polystyrene, and more particularly involves methods and apparatus for reducing impurities in the recycle streams of polymerization processes.

In polymerization processes such as polystyrene polymerization for instance, a recycle stream is taken from the reactor product stream and returned to the initial entry point for the reactor. The recycle stream typically contains unreacted monomer, diluents, decomposition products formed from polymerization initiators, and other contaminants. Typically, trace contaminants are present at levels ranging from 10 up to about 500 parts per million (PPM).

In the continuous process of polymerizing styrene monomer into polystyrene and high impact polystyrene (HIPS), a common process of carrying out the polymerization is in reactor vessels, using polymerization initiators such as t-butyl peroxybenzoate, benzoyl peroxide, and other peroxides. One disadvantage of using such initiators is that a byproduct of the polymerization process using these initiators is acid decomposition by-products, such as benzoic acid, which acidic species then react with the initiator and, as a consequence, inhibit further polymerization, when recycled with unreacted monomer back into the polymerization reactors. consequence, inhibit further polymerization, when recycled with unreacted monomer back into the polymerization reactors.

One method of handling this problem is that disclosed in U.S. Pat. No. 4,857,587 to Sosa, et al, in which recycled unreacted monomer is passed through a recycle treatment vessel to remove acidic species. The vessel would normally contain an adsorbent material such as alumina or clay to remove a major portion of the acid component from the recycle stream.

Other methods and apparatus for reducing the effect of acid decomposition by-products in the recycle stream are disclosed in the two Sosa et al patents, U.S. Pat. Nos. 4,777,210 and 4,861,827. The '210 patent discloses a pre-inversion reactor to control particle size and the '827 patent teaches the use of initiators which do not decompose into acid by-products during the polymerization process.

Sosa et al U.S. Pat. No. 5,200,476 issued Apr. 6, 1993, discloses a system for reducing volatiles in a polymerization line, said system utilizing partial condensers, total condensers, devolatilizers, and filter beds arranged in series.

Additional patents to Sosa, et al, include U.S. Pat. No. 5,527,511; and U.S. Pat. No. 5,531,967 wherein methods and apparatus are disclosed for removing undesirable volatile components having high boiling points from a product stream during polymerization of monovinyl aromatic compounds such as styrene, which methods include the use of heat exchangers, devolatilizers, and filter beds.

U.S. Pat. No. 5,540,813 to Sosa et al, issued Jul. 30, 1996, discloses methods and apparatus for purifying polymerized monovinyl aromatic compounds such as polystyrene by reducing the residual monomer content of the finished polymer, said methods and apparatus including a combination of heat exchangers and devolatilizers used in conjunction with a monovinyl aromatic polymerization reactor system.

The entire disclosures of each of the aforementioned Sosa et al patents, U.S. Pat. No. 4,857,587; U.S. Pat. No. 4,777,210; U.S. Pat. No. 4,861,827; U.S. Pat. No. 5,200,476; U.S. Pat. No. 5,527,511; U.S. Pat. No. 5,531,967; and, U.S. Pat. No. 5,540,813 are hereby incorporated herein by reference.

The disadvantages of conventional methods such as alumna/clay filter beds is that the beds must be regenerated often, which necessitates a time delay and is expensive; and devolatilization introduces heat into the recycle streams which affects the free-radical processes by creating species that may act as inhibitors; for example, decomposition products of phenolic antioxidants.

SUMMARY OF THE INVENTION

The present invention overcomes the disadvantages of the conventional recycle purification methods by reacting the recycle stream in a reactor in order to polymerize the species contained in the recycle stream that would tend to retard polymerization when recycled into the main polymerization reactor.

DESCRIPTION OF THE PREFERRED EMBODIMENTS

Figure 1:
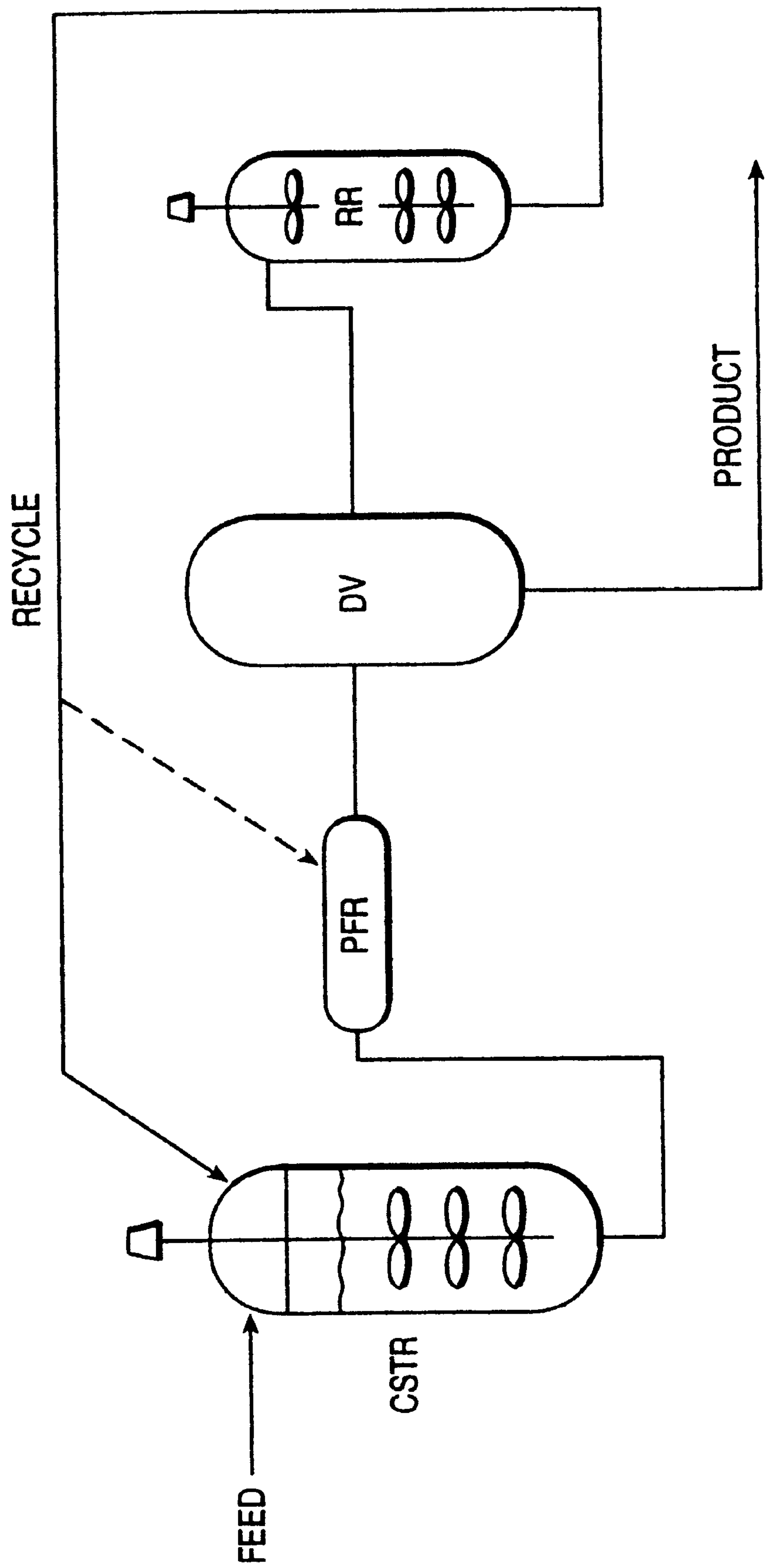
FIG. 1 is a simple schematic flow-diagram illustrating a basic monovinylaromatic polymerization process embodying the present invention; and, FIG. 2 is a schematic diagram of a commercial polystyrene manufacturing plant embodying the present invention.

FIG. 1 illustrates a simple schematic flow diagram of a basic monovinylaromatic polymerization process wherein a feed stream, designated FEED and comprising essentially monovinylaromatic monomer such as styrene, is fed to a primary polymerization reactor comprising a continuous stirred tank reactor CSTR. A polymerization initiator such as t-butyl peroctoate, 1,1-di(t-butylperoxy)cyclohexane, Ethyl-3,3-di-(t-butylperoxy) butyrate, or other peroxide, may be added to the feed stream or directly into the reactor. The partially polymerized stream then exits the CSTR and is fed to a plug flow reactor PFR to continue the polymerization process. The product stream from the PFR is then fed to a devolatilizer DV to separate polymer product from unreacted monomer and other volatiles. The product is piped from the DV through the line designated PRODUCT. The condensed liquid is then piped into the recycle reactor RR which may be of any type of known reactor. In one embodiment, it was found that a continuous stirred tank reactor was particularly advantageous for use as the recycle reactor RR.

A polymerization initiator, such as Luperox L233 manufactured by Elf Atochem, and essentially consisting of Ethyl-3,3-di-(t-butylperoxy)butyrate is added to reactor RR at the rate of about 100–500 PPM, by weight of total feed to RR. The temperature in reactor RR is maintained in the range of 100–180° C., preferably about 135° C., and a reaction time of about 10 minutes to 60 minutes, and preferably 20–30 minutes is set in reactor RR. Such conditions have been found to eliminate the inhibitory effect that trace contaminants have on free-radical polymerization. The purified and polymerized recycle stream exiting reactor RR is then piped back to the primary reactor CSTR and/or to the secondary reactor PFR, as indicated by the phantom line to PFR.

Figure 2:
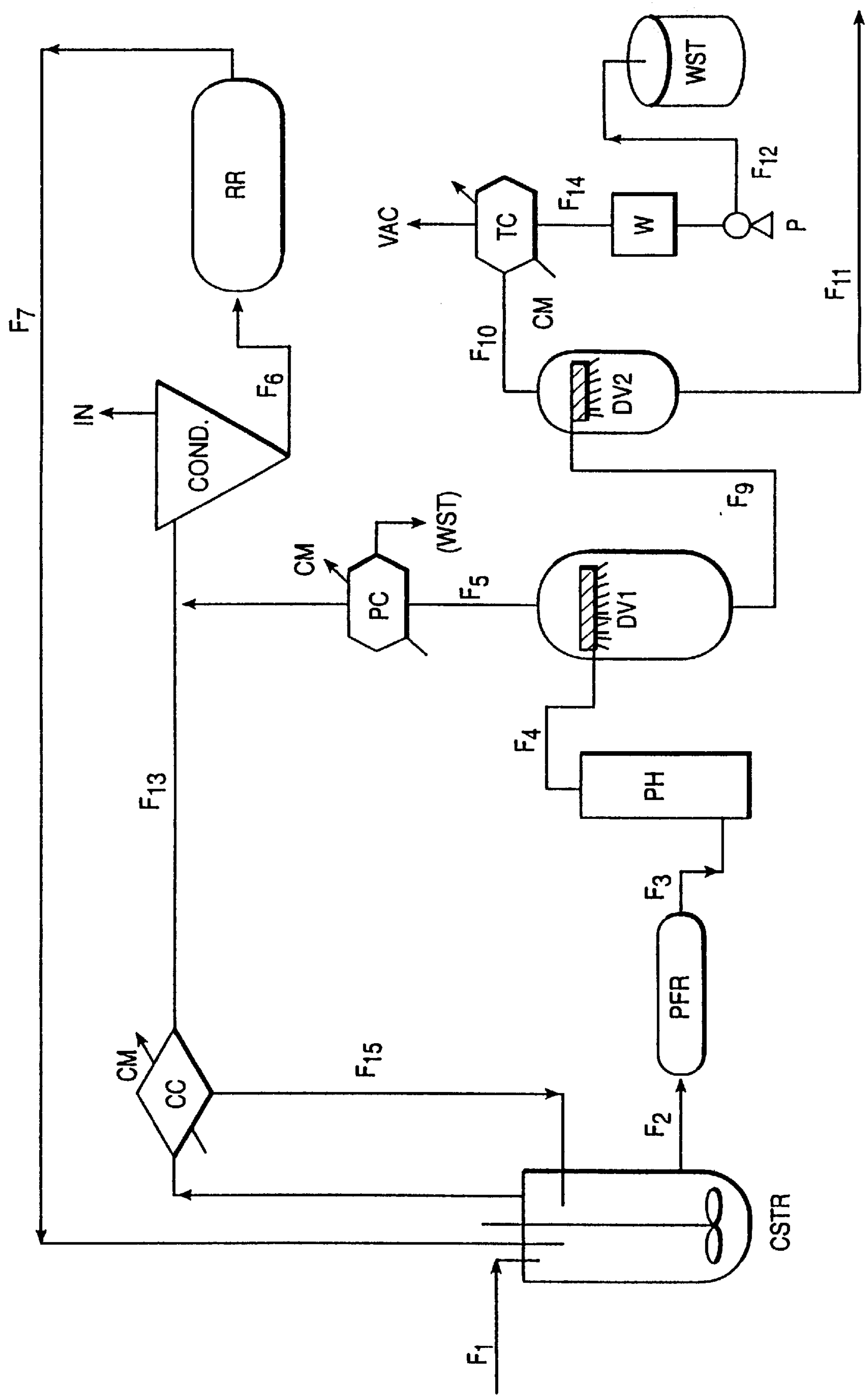

Referring now to FIG. 2, there is illustrated therein a schematic representation of a series of reaction vessels and associated apparatus useful in the practice of styrene polymerization and more particularly in the production of rubber-modified styrene using the process of the present invention.

In the manufacture of HIPS material using this process, styrene, polybutadiene, a free-radical initiator, and additional components such as solvents, anti-oxidants, and other additives are usually fed to a polymerization reactor indicated at CSTR through a feed line or multiple feed lines generally indicated at F1. The polymerization reactor CSTR is of the type commonly referred to as a continuous stirred tank reactor. As used herein, the term "styrene" includes a variety of substituted styrenes, e.g. alpha-methylstyrene, ring-substituted styrenes, such as p-methylstyrene and p-chlorostyrene, as well as unsubstituted styrene. Typically, the mixture in polymerization reactor CSTR will comprise about 75 to 99% by weight styrene, about 1 to 15% by weight polybutadiene, about 0.001 to 0.2% by weight free-radical initiator, and about 0.1 to about 6% by weight additional components.

The reactor CSTR, as previously mentioned, is a continuously stirred tank reactor which operates at a percent solids level above the inversion of the polymer system. That is, the polymerization reactor operates at a percent solids level such that the system has a continuous phase of polystyrene and a discontinuous phase of dispersed droplets of rubber; or preferably, the droplets are a mixture of polystyrene and rubber.

The CSTR reactor is sometimes also referred to as a "boiling reactor" which means that the styrene/polystyrene/rubber mixture therein is allowed to "boil" by vaporization of the lighter components (styrene monomer, ethylbenzene, for example). This vaporizing of lighter compounds serves to remove a large amount of the heat of polymerization, and allows the operator to better control the rate of polymerization in the CSTR vessel.

The vapor components from the CSTR reactor are drawn off the vessel and piped via line F13 to the main condenser as described hereinbelow, there to be condensed for return to the reactor via the recycle stream.

In this preferred embodiment, the vaporized volatiles from the reactor CSTR, which comprise desirable lower boiling point volatiles such as unreacted monomer and ethylbenzene for example, and undesirable volatiles such as acid species and other higher boiling point volatiles, are drawn off of the upper part of the CSTR reactor to allow the eat of polymerization to be controlled by removing it in the form of these vaporized olatiles. These volatiles are piped to a control condenser CC in the vapor line F13, hich control condenser is operated at conditions just severe enough to condense part of he stream. The control condenser is used to control the heat of the exothermic polymerization reaction in the CSTR. The condensed volatiles are returned directly from the control condenser CC to the reactor CSTR via return line F15. The remaining uncondensed volatiles are transported from the control condenser CC to the main condenser COND for condensation and removal of undesirable compounds in recycle reactor RR, before adding them to the normal recycle stream.

Preferably, the apparatus used in practicing the present invention may additionally comprise a second polymerization reactor of the continuous stirred tank reactor type which is operated at a preinversion condition, i.e. the continuous phase therein is a styrene-rubber solution and the discontinuous phase is polystyrene. The preinversion reactor (not shown) is usually located directly ahead of, or upstream of, the polymerization reactor CSTR such that the styrene, polybutadiene, free-radical initiator, and other components are fed to the preinversion reactor first and the mixture exiting the preinversion reactor is then fed to the CSTR reactor. The preinversion reactor is also preferably a continuous stirred tank reactor.

The liquids/solids output from the polymerization reactor CSTR is fed to another polymerization reactor through flow line F2 where post-inversion stage polymerization occurs. Preferably this next polymerization reactor is a linear-flow reactor, such as a plug flow reactor, but may also be a tower-type reactor or other known reactor configuration. The figure indicates a single linear-flow reactor PFR, whereas more than one linear-flow reactor may be utilized, placed in serial connection with the PFR reactor. This achieves increased polymerization in each subsequent horizontal reactor. The output from the plug flow horizontal polymerization reactors is at a temperature of around 340° F. and is directed to a preheater PH, and from there to a conventional devolatilizer DV1 through flow lines F3 and F4, respectively. The temperature of the material leaving the preheater is preferably in the range of about 480° F. Unreacted styrene monomer and other volatile residual components leave devolatilizer DV1 through overhead line F5 as a recycle stream component. This recycle stream is preferably returned to the present system after condensation in the condenser COND and further treatment in recycle reactor RR as more fully described herebelow. The treated recycled stream then flows through flow line F7 back to the polymerization reactor CSTR.

The recycle reactor RR is preferably of the continuous stirred tank reactor (CSTR) configuration and is a conventional design. In one particular embodiment, the reactor RR, for use in a large HIPS manufacturing facility, is sized in the range of about 2000 gallons capacity. The recycle stream out of DV1 in line F5, when combined with the higher-boiling volatiles in line F13 from the control condenser, is passed through main condenser COND where the vapors are totally condensed and passed to the reactor RR. This stream of liquefied compounds contains about 70–80% monovinyl aromatic monomer (SM) and the remainder is ethylbenzene (EB), xylenes, and contaminants. The contaminants include phenols and quinones that act as polymerization inhibitors if added back into one of the main CSTR or PFR reactors, causing lower conversion rates and higher loads on these reactors. These contaminants may also degrade the quality and color of the finished monovinyl aromatic polymers such as polystyrene. By replacing the conventional alumina-bed filter/treater with the recycle reactor RR, the operator is able to initiate the recycle stream and polymerize it to a point where the inhibitor-species no longer affects the polymerization process in the main reactors. Also, the expensive alumina bed vessels are eliminated, as are the expensive and time-consuming regeneration cycles for the alumina-bed treaters.

In one example of a process using the recycle reactor, a continuous stirred tank reactor was utilized as recycle reactor RR and the recycle stream from a HIPS process was passed through the recycle reactor. An initiator consisting of 200 PPM Luperox L233, a previously identified commercially available styrene polymerization initiator, was added at 135° C. to RR, with a reaction time of approximately 30 minutes.

The polymerized recycle stream exiting the test reactor RR contained approximately 10 percent desirable polymer ($M_n \cong 90{,}000$; $M_w \cong 200{,}000$), and there was a significant quantity of unreacted initiator, in the range of 135 PPM, still in the polymerized recycle stream. Undesirable inhibitor species such as phenols and quinones had been reacted with styrene monomer and initiator to form oligomers consisting of dimers and trimers, which would have no detrimental effect when the polymerized stream is reintroduced into one of the primary reactors. It should be noted that FIG. 2 indicates that the polymerized recycle is returned to the CSTR reactor, however it would be possible and reasonable to return the stream to the PFR reactor instead.

It should also be noted that some styrene polymerization systems utilize multiple CSTR type reactors and/or multiple PFR type reactors. (For example, see the aforementioned Sosa et al patent, U.S. Pat. No. 4,861,827 which discloses two CSTRs and two PFRs.) In this instance, the polymerized recycle stream could be fed into either of the CSTRs or either of the PFRs.

The initiator still remaining in the polymerized reactor stream further aids additional styrene polymerization in the reactor receiving the recycle stream. This combination of added polymerization in the recycle reactor, initiation of the acid species, and return of unreacted initiator to one of the main reactors all contribute to higher overall conversion rates for the reactor system as well as improved gel:rubber ratios.

The reacted acid species trapped in styrene oligomers pass through the reactor system mostly as inerts and are eventually removed in the condenser TC via line F14 to waste tank WST.

Although not illustrated in the drawings, it is also feasible to place a recycle reactor in line F14 passing from the total condenser TC to the waste system in order to recover some of the unreacted monomer which would otherwise pass into the waste system. This stream is normally burned for plant fuel or to fuel heaters in the polymerization system. Due to the lower level of styrene monomer, i.e. only about 35–50%, and the small size of the stream in line F14, the recovery of usable polymer would be significantly slower and provide less polymer product. In such a configuration, the output of a second recycle reactor, located in line F14, would be to one of the primary reactors CSTR or PFR, and not to the waste system as illustrated in FIG. 2.

Referring back to the output of devolatilizer DV1, in addition to the overhead recycle stream containing the aforementioned volatile components flowing through F5, the polymerization reactants, at about 99.5% solids and comprising polymerized high impact polystyrene and nonvolatile components at a temperature of about 440° F., flow out the lower end of DV1 through flow line F9 to a second devolatilizer DV2. In devolatilizer DV2 additional volatile components are separated and flowed out through line F10, and finished polystyrene or high impact polystyrene moves through product line F11 at a temperature of about 440° F. to a pelletizer or other type of finished product formulation unit.

The devolatilizer's DV1 and DV2 preferably have conventional heating elements, such as external heater coils, arranged to maintain the reactant stream therein at a relatively constant temperature in the range of about 440° F.

The devolatilizers use a combination of the heat already in the material, heat added by the heater coils, and a vacuum in the range of about 1 to 10 mm Hg to vaporize or "boil-off" the volatiles in the stream. Preferably the first devol unit DV1 maintains a low pressure (vacuum) of around 5–10 mm Hg and the second devol a lower pressure (higher vacuum), in the range of only about 1 mm Hg.

This higher pressure (lower vacuum) in DV1 then preferentially vaporizes the desirable lower boiling point volatiles such as styrene monomer, ethylbenzene, and other aromatics and vinyl structures. On the other hand, the greater vacuum in DV2 allow the undesirable, higher boiling point volatiles to be boiled off therein, such as the oxygenated species, acids, quinones, phenols, etc.

The volatile components from DV2 flowing through line F10 are then passed through a total condenser TC which totally condenses these volatile components by means of a cooling medium CM flowing thereacross, and these condensed components are then flowed through waste line F14 to waste sump W. A pump P then pumps the waste components through line F12 to the waste storage tank WST.

The recycling streams coming off of the devolatilizers DV1 and DV2 contain a variety of impurities. The major impurities in these streams can be traced to products of reactions between species necessarily present in the recycle stream, such as styrene monomer and anti-oxidant, impurities from the rubber, and unwanted species in the systems, such as oxygen. Although some of the recycle stream impurities are innocuous, it has been unexpectedly discovered that certain impurities in the recycle stream adversely affect the polymerization process and/or the resultant HIPS product when the recycle stream is introduced back into the system.

TYPICAL OPERATION OF THE PREFERRRED EMBODIMENT

In operating the continuous process of the present invention, polymerization of the styrene monomer is initiated by the decomposition of a free-radical initiator. Initiating radicals for the polymerization reaction are generated by the decomposition of a free-radical initiator into one or more primary radicals. The primary radical then reacts with styrene monomer to initiate polymerization.

Typically, the free-radical initiator is fed to the first polymerization reactor CSTR which is maintained at conditions under which the free-radical initiator decomposes, although it may also be provided to the aforementioned preinversion reactor ahead of the CSTR reactor or it may be introduced at the linear flow reactor PFR. The free-radical initiator may alternatively be selected such that it will not decompose in the first polymerization reactor and rather will decompose under the conditions maintained in some subsequent polymerization reactor such as the PFR or subsequent linear flow reactor. In this case, polymerization of styrene monomer in polymerization reactors can e thermally initiated. Alternatively, a combination or two or more free-radical initiators can be used, such that one free-radical initiator decomposes in the polymerization reactor CSTR and another free-radical initiator decomposes in the linear flow reactor PFR.

Decomposition of the free-radical initiator, which initiates polymerization of the styrene monomer, also produces decomposition by-products which do not participate in the polymerization reaction. In the present continuous flow process, these decomposition by-products of the free-radical initiator are removed from the HIPS polymer in the devolatilizers DV1 and DV2 and, unless removed from the recycle stream, would be reintroduced into the polymerization reactors.

Investigation of the effects of various recycle stream components upon styrene polymerization has shown that acid decomposition by-products of free-radical initiators react with such initiators, thereby inhibiting styrene polymerization. It is believed that these acidic decomposition by-products adversely affect free-radical initiator efficiency by inducing decomposition of the free-radical initiator and/or trapping free-radicals produced by spontaneous (as opposed to induced) decomposition of the free-radical initiator. Thus, the acidic decomposition by-products decrease the number of free-radicals available to initiate polymerization of the styrene monomer, which in turn decreases the efficiency of the free-radical initiator.

Benzoic acid is also produced from the air oxidation of benzyladehyde, which in turn is produced from the oxidation of styrene. Other acidic species may be present in the polybutadiene rubber. It is well know that phenolic antioxidants, sulphur components, and substituted phosphites are added to protect the rubber from oxidation. The aforementioned incorporated patent U.S. Pat. No. 4,857,587 lists several acid-producing ree-radical initiators and their corresponding acid decomposition by-products. Also shown therein is a graphical illustration of the detrimental effects of benzoic acid on styrene polymerization when using the free-radical initiator t-butyl peroxybenzoate.

In addition to the removal of some of the acid by-products species from the volatile line off of devolatilizer DV1, it has further been found that by proper selection of vacuum levels in the devolatilizers, a larger percentage of the undesirable products can be made to pass out through product line F9 from DV1 and into the second devolatilizer DV2 where those undesirable volatile components can be removed from the polymerized material thereby preventing overburdening of the clay bed treater while obtaining a further protection of the initial free-radical initiators.

In the present invention, the major portion (approximately 80%) of the volatile components leading from the preheater PH are removed in devolatilizer DV1 and passed through flow line F5. Approximately 20% of the removable volatiles are then removed from the polymer stream in devolatilizer DV2. Originally the volatile components from DV2 were added back into the recycle stream F5 through flow line F10. It has been found however that a major portion of the undesirable acidic by-products are removed in the volatiles of DV2 rather than DV1. More than 80% of the total volatiles are removed in DV1 and added to the recycle stream and less than 20% of the total volatiles are removed from DV2, yet the low volatile output of DV2 comprises a major portion of the acidic by-products which destroy the free-radical initiators. Therefore, it was found that rather than adding the output of devolatilizer DV2 back into the recycle stream, recycle reactor conversion rate can be improved significantly by routing the volatiles from DV2 into a total condenser TC through flow line F10, totally condensing all of the volatiles, and removing them to a waste sump W whereupon they are pumped by pump P to the waste storage tank WST.

Thus the loss of less than 20% of the volatiles from the recycle stream results in removal of more than half of the undesirable acid decomposition by-products from the recycle stream.

The present invention comprises a process, and apparatus for performing the process, for manufacturing polymerized styrenics, which process includes the steps of utilizing a combination of devolatilizers and a partial condenser to remove volatile components from the polymerized styrene material and further polymerizing the volatile components to remove destructive acid by-products. The process further encompasses a second devolatilizer downstream of a first devolatilizer for selectively removing undesirable volatile components from the finished polystyrene and, instead of recycling these undesirable volatile components, condensing them in a total condenser and pumping them either to a second recycle reactor for further polymerization, or else, to a waste storage tank. The removal of all of the volatile components from the second devolatilizer results in a loss of less than 20% of the total volatiles but also results in removal of more than half of the destructive acid by-product components. An additional decrease in the burden on the condenser is achieved using a partial condenser in the reactor vessel vapor recycle stream Although the invention has been described with reference to particular embodiments thereof, it will be apparent to those skilled in the art that various changes and modification can be made without departing from the spirit of the invention or from the scope of the appended claims.

The embodiments of the invention in which an exclusive property or privilege is claimed are defined as follows:

1. A continuous process for polymerizing monovinyl aromatic monomer compounds, said process comprising the steps of:

producing a product stream from a monovinyl aromatic monomer stream by polymerization in a reactor vessel system;

controlling reaction temperatures in said reactor vessel by allowing the products in said vessel to boil off the volatiles therein at temperatures and pressures sufficient to primarily vaporize only the volatile constituents;

removing said vaporized volatiles from said reactor vessel;

partially condensing said volatiles to separate the lower boiling point volatiles from the higher boiling point volatiles;

returning the condensed higher boiling point volatiles to said reactor vessel;

transferring said lower boiling point volatiles to separate condensing and polymerization systems;

separating at least one cut of volatile compounds out of the solids and non-volatile liquid compounds in said solids and non-volatile liquid compounds in said product stream to form a partially-purified stream;

condensing said at least one cut of volatiles in said condensing system and thereafter removing undesirable compounds therefrom by polymerizing said volatiles to form a purified recycle condensate;

recycling said purified condensate back into said reactor vessel system;

passing said partially-purified stream through an additional devolatilization at a higher vacuum than the previous devolatilization, thereby separating an additional cut of volatile compounds from said stream and forming a purified stream;

removing said additional cut of volatile compounds from said process; and flowing said purified stream of polymer into a finishing system.

2. A method of removing undesirable species selected from the group consisting of acids, oxygenated species, quinones, and phenols, from a processing stream of polymerized and unpolymerized monovinyl aromatics in a polymerization reactor system, said method comprising:

subjecting said processing stream to at least one devolatilization in said polymerization reactor at less than atmospheric pressure and at temperatures sufficient to boil off a substantial portion of the volatiles, including unreacted monomer and ethylbenzene, in said processing stream;

partially condensing said vaporized volatiles outside said reactor to primarily condense the desirable volatiles, and then returning them to said polymerization reactor system;

transferring said remaining volatiles to a polymerization recycle system;

subjecting said processing stream to a first and second devolatilization outside said reactor in separate devolatilizer vessels at temperatures and pressures sufficient to vaporize desirable and undesirable volatiles from said processing stream; and, condensing said undesirable volatiles and removing them, while recycling the desirable polymerized volatiles back to the reactor system.

3. The process of claim 2 further comprising the additional step of polymerizing condensed desirable volatiles in a recycle polymerization reactor to remove undesirable species prior to returning said condensed volatiles to said reactor system, and to polymerize monovinyl aromatic monomer contained in said condensed volatiles.

4. The process of claim 3 wherein said first devolatilization outside said reactor is performed at about 440° F. and about 5–10 mm Hg pressure, and said second devolatilization outside said reactor is performed at about 440° F. and about 1–2 mm HG pressure.

5. In a monovinyl aromatic polymerization process wherein a monovinyl aromatic monomer feed stream is fed into at least one polymerization reactor to partially polymerize said monomer feed stream, thereby forming an unpurified product stream which is then fed into a devolatilizer to remove unpolymerized monomer therefrom, with the removed unpolymerized monomer being recycled as a recycle stream back into said reactor, the improvement comprising the additional step of passing said recycle stream through a recycle reactor to further polymerize a portion of the monomer in said stream and to additionally polymerize at least one undesirable contaminant in said recycle stream prior to said stream reentering said polymerization reactor.

6. The process of claim 5 wherein said recycle stream is condensed by passing it through a condenser prior to said recycle reactor, and wherein a polymerization intitiator is added to said stream between said condenser and said recycle reactor.

7. The process of claim 6 wherein said initiator comprises from about 10 to about 500 parts per million (by weight of total feed) of a monovinyl aromatic polymerization initiator selected from the group consisting of t-butyl peroctoate, 1,1-di(butylperoxy)cyclohexane, Ethyl-3,3-di-(t-butylperoxy) butyrate, and other peroxides.

8. The process of claim 7 wherein said recycle reactor is operated at a temperature in the range of 100 to 180 degrees centigrade, and the reaction time is from 10 to 60 minutes.

9. The process of claim 8 wherein said polymerization reactor comprises a continuous stirred tank reactor, said process further comprises at least one additional polymerization reactor which is a plug flow reactor, and said recycle reactor is a continuous stirred tank reactor.

10. The process of claim 9 wherein said monovinyl aromatic monomer is styrene and an elastomer is added to said styrene stream in order to form high impact polystyrene as a final product; wherein said elastomer is a conjugated diene rubber.

11. The process of claim 10 wherein said monomer stream consists essentially of about 70 to 99% by weight styrene monomer, about 1 to 15% by weight elastomer, and about 0.001 to 0.2% by weight of free-radical initiator.

* * * * *